United States Patent Office 3,819,793
Patented June 25, 1974

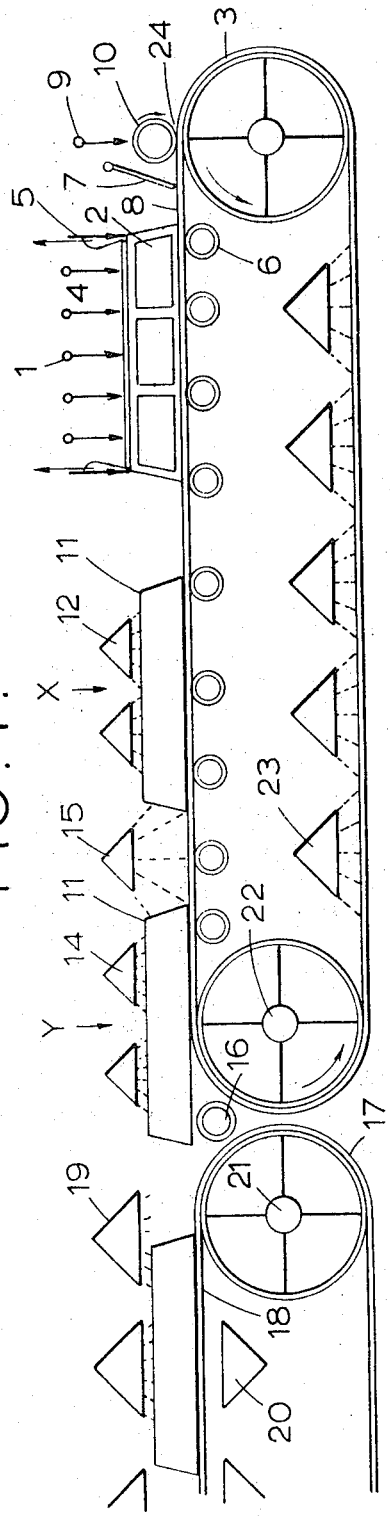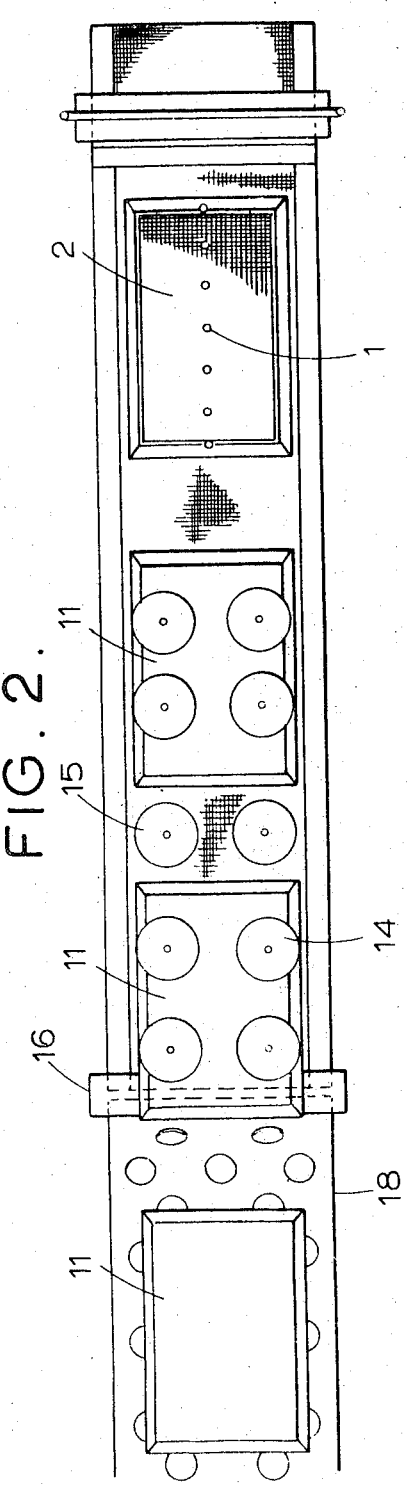

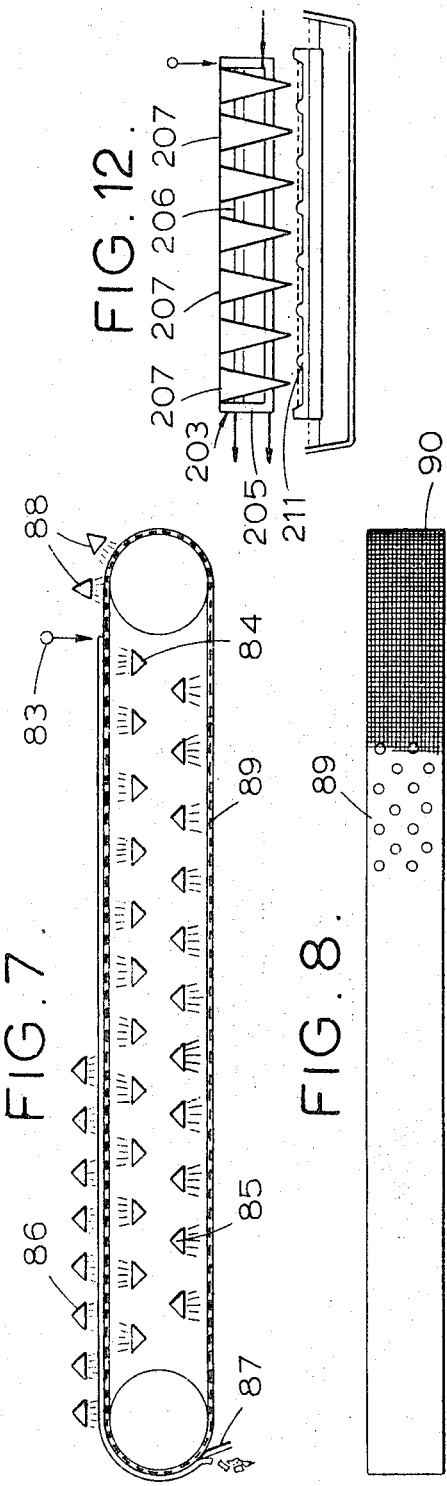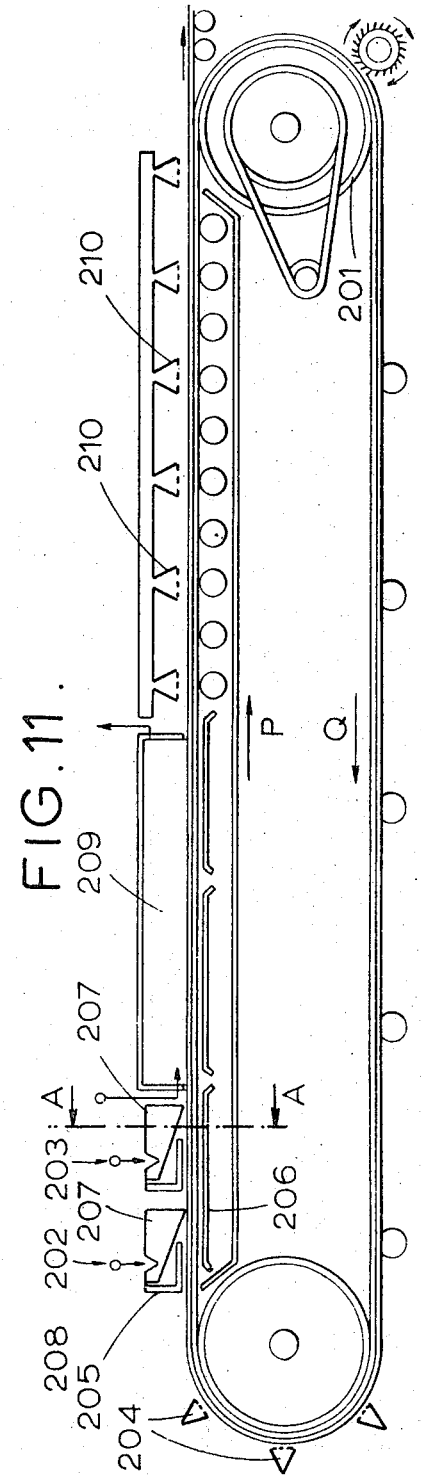

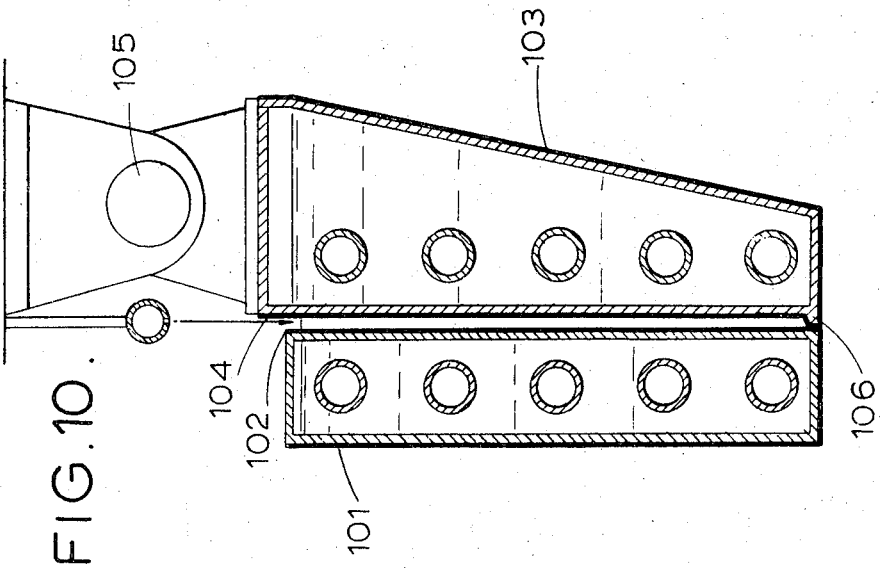
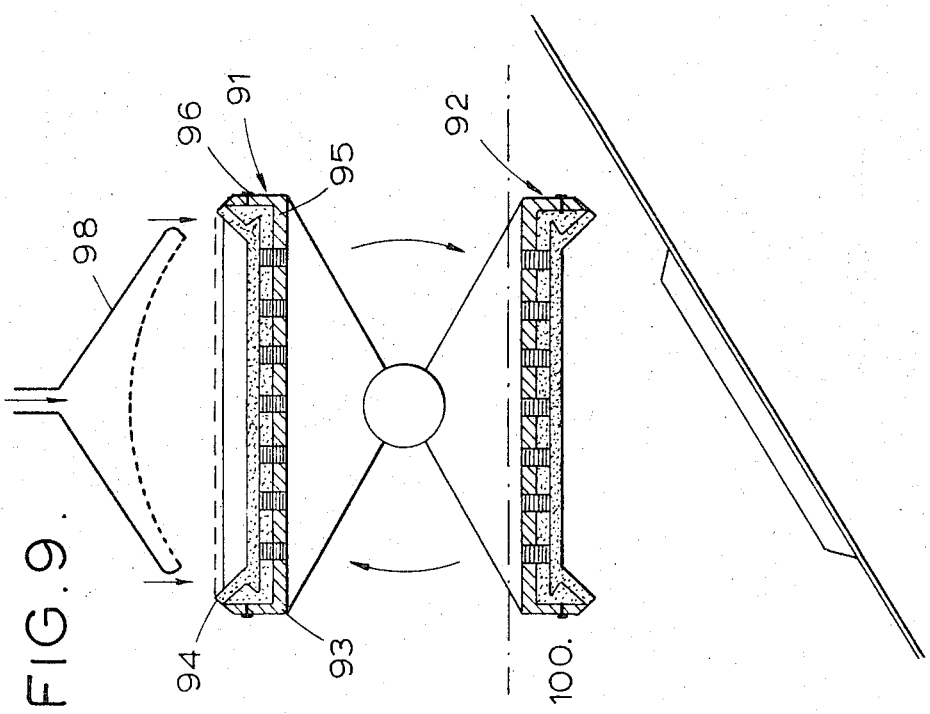

3,819,793
METHOD AND APPARATUS FOR CASTING THERMOPLASTIC MATERIALS, E.G. SULPHUR AND BITUMENS
Herbert James Elliott, "The Bungalow," Budbury, Bradford-on-Avon, England
Filed Apr. 8, 1971, Ser. No. 132,528
Claims priority, application Great Britain, Apr. 10, 1970, 17,156/70; Feb. 8, 1971, 4,115/71
Int. Cl. B29d 7/02
U.S. Cl. 264—213
8 Claims

ABSTRACT OF THE DISCLOSURE

Method and apparatus are provided for casting thermoplastic materials, e.g. sulphur and bitumens. Thermoplastic material in molten condition is deposited onto a receiving surface which is maintained sufficiently moistened to prevent adhesion thereto but at the same time avoiding such a concentration of water which would result in occlusion in the solidified material. Examples of suitable receiving surfaces are wetted adsorbent surfaces such as unglazed ceramics, paper, soft woods and fabrics, textured and finely apertured surfaces e.g. wire mesh, and expanded plastics materials, including expanded regenerated cellulose materials.

BACKGROUND OF THE INVENTION

Many materials are obtained in bulk molten condition in a final stage of preparation or refining, whereas it is desirable for ease of packaging and transportation that the material should be in solid, broken form. Examples of such materials are sulphur, bitumens and thermoplastic resins such as polystyrene, bitumens and thermoplastic resins such as polystyrene, rosin and rosin derivatives. For convenience these materials and other materials which are solid at room temperature but which on heating form a liquid which is capable of being poured and which resolidifies on cooling are termed "thermoplastic materials" in this specification and in the appended claims.

Conventionally adopted methods of recoving such liquid thermoplastic materials in solid form tend to be slow and laborous or involve difficulties in removing the solidified material from the substrate on which it is poured.

In the case of sulphur it is common practice to pour the molten material into stock piles which are subsequently broken up by manual or mechanical means. This procedure involves the expenditure of considerable energy and produces large quantities of sulphur dust which is an unpleasant pollutant as well as being undesired by commerce in this form.

In one prior method for solidifying resinous material, the molten resin is poured onto a cooled conveyor belt in the form of a thin layer which is sodified on the belt. Even when using a highly polished metal belt, difficulty is frequently encountered in removing the cooled solidified material from the belt and this problem is aggravated if one attempts to obtain the solidified material in thicknesses greater than about ¼".

It is the primary object of the present invention to devise a method of casting thermoplastic materials in substantial thicknesses, while avoiding adhesion of the material to surfaces contacted by the molten material.

SUMMARY OF THE INVENTION

According to the present invention there is provided a method of casting a thermoplastic material which comprises contacting said thermoplastic material in molten condition with a substrate which is wetted with an aqueous liquid, said liquid being present in sufficient amount to prevent sticking of the thermoplastic material to the substrate without significant occlusion in the resulting solidified material.

DESCRIPTION OF THE INVENTION

The present invention is based on the surprising discovery that by maintaining a layer of water vapour between the sodifying material and the substrate on which it is poured, adhesion of the material to the substrate is substantially prevented.

It is important, however, to avoid the presence of excess water since this can readily result in occlusion of water within the thermoplastic material as it cools, thereby rendering the material unsaleable if the water is occluded in significant amounts. On the other hand if insufficient water is present on or within the receiving substrate, or the water is not uniformly distributed over the surface of the substrate, "hot spots" tend to occur and the thermoplastic material adheres at this point. These "hot spots" tend to occur more readily when the molten thermoplastic material is poured onto the substrate in a concentrated stream inasmuch as the stream punctures the thin sodified skin of thermoplastic material which is formed when the molten material contacts the wetted receiving surface. If the skin is punctured in this way, entrapped vapour is allowed to bubble through the main body of the molten material on the receiving surface and results in occlusion of water in the resultant solidified product.

I have found that generally speaking, the receiving substrate, if it is non-adsobrbent, should be wetted with a relatively thin film of water, e.g. up to about ⅛" in depth but preferably from about 1/64" to 1/32" in depth. The molten material when poured onto the substrate apparently forms a thin skin and at the same time causes almost instantaneous vapourisation of the water film which is thus trapped between the solidified skin and the substrate. This layer of vapour prevents the thermoplastic material from sticking to the substrate.

I have further discovered that it is possible to select particular types of substrates which make it easier to successfully control the method of the invention and to steer a middle course between insufficient water and excess water.

For example, it has been found that the optimum quantity of water can be readily maintained by using a porous, adsorbent substrate whose pores are not large enough for the thermoplastic material to flow therein. Examples of suitable materials in this class include unglazed ceramics (e.g. terra-cotta), foamed cement, soft wood, plaster of Paris, fabrics (e.g. canvas), paper and expanded plastics and rubbers, including expanded regenerated cellulose. The pores of the adsorbent surface should preferably be small enough to avoid significant penetration of the molten thermoplastic material into the substrate. When using this class of materials it is not essential to have a film of water lying on its surface, although the surface should be visibly quite damp. In order to ensure that sufficient water is present, the surface may be wetted until it is saturated or until a film about 1/32" in depth covers the surface.

Alternatively instead of an adsorbent surface, the substrate may have a textured surface, obtained for example by pressing, indenting or otherwise so that the surface provides a number of recesses within which water can be contained. The recesses are preferably small in size, e.g. providing 10 or more recesses per linear inch, and relatively shallow. A similar result can be achieved by using a substrate consisting of a mesh screen supported on a backing surface. In some cases the backing surface can be dispensed with in which case the mesh should desirably comprise several superimposed layers, each having openings which are 60 mesh USS or finer, preferably 100 mesh USS or finer e.g. up to 300 mesh USS. Preferably such individual mesh layers are bonded together e.g. by spot welding.

As a further alternative, the substrate may comprise a natural or synthetic rubber which may or may not be supported on flexible or rigid backing material. Preferably, however, the rubber forms the surface of a flexible belt which can be distorted to facilitate removal of the solidified thermoplastic material therefrom. Best results are obtained with rubbers having release properties, e.g. silicone rubbers. Owing to the difficulty of maintaining a film of water over a plane rubber belt, it is preferred to employ a belt having a textured or patterned surface or formed into a plurality of mould cavities. If a plane rubber belt or other plane surface is employed it is preferred to add a surface active agent to the water in order to guard against the formation of "hot spots" as discussed above. These are much more likely to occur when operating with a plane surface.

The method of the present invention may be employed for casting thermoplastic materials on a continuous or batch basis. In either case it is not essential to positively wet the sidewalls of the moulds employed if the materials recommended above for the substrate are also employed for the mould walls. It is interesting to note that if a mesh screen (having openings insufficiently large to permit passage of the molten material are employed) is used as the material of a mould wall, it is possible to tolerate a greater depth of water on the base of the mould. It is believed that the reason for this phenomenon is that the thermoplastic material is able to displace excess water through the mould walls.

The invention includes apparatus for carrying the invention into effect which comprises a substrate for receiving molten thermoplastic material, wetting means for applying an aqueous liquid to the substrate, means located downstream of the wetting means for depositing molten thermoplastic material on the wetted substrate and means for applying additional cooling fluid to the substrate and thermoplastic material downstream of the means for depositing the molten material.

Preferably the substrate has a surface of the type recommended above. In one preferred embodiment the substrate is a belt comprising a perforated or unperforated metal base strip having one or more wire mesh facing layers secured to its surface. In another preferred embodiment, the substrate comprises a base strip (preferably of rubber or other flexible material) and having a facing comprising an expanded, regenerated cellulose.

The invention will now be illustrated with reference to the accompanying drawings in which:

FIG. 1 is an elevation partly in section of one embodiment of apparatus in accordance with the invention;

FIG. 2 is a plan view of the apparatus shown in FIG. 1;

FIG. 7 is an elevation in cross-section of a further apparatus for carrying out the method of the invention;

FIG. 8 is a plan view of the apparatus shown in FIG. 7;

FIG. 9 is a section through a further embodiment of apparatus for carrying out the invention;

FIG. 10 is a section through an additional embodiment of apparatus for carrying out the invention;

FIG. 11 is a longitudinal section through apparatus for carrying out the invention; and FIG. 12 is a section on the line A—A in FIG. 11.

Figure 3:
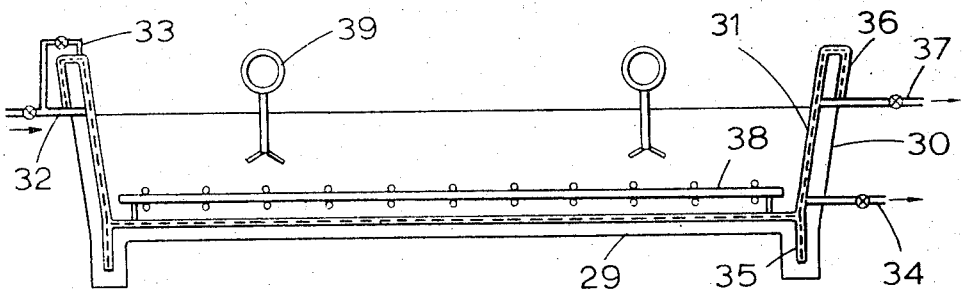
FIG. 3 is an elevation in cross-section of a mould suitable for carrying out the process of the invention.

Referring to FIGS. 1 and 2 of the drawings the apparatus comprises a series of heated molten material feed means 1 which are disposed to feed molten thermoplastic material into a reinforced lift mould 2 which in the position shown in the drawing is resting on an endless conveyor belt 3. The conveyor belt 3 is desirably imprinted with a relief pattern or is a composite belt consisting of a metal base strip carrying a perforated upper surface layer e.g. a wire mesh layer. The mould 2 has no base or top and its sides are constructed from a metallic frame and lined with a continuous wire mesh facing material. A perforated water feed line is attached to the top periphery of the mould 2 and is arranged to drip-feed water down the whole mesh surface of the sides of the mould. Lifting means 5 are provided to raise and lower the mould onto the belt 3. The upper run of the belt is supported by a series of support rollers 6 and the conveyor belt 3 is wetted with water by means of a water feed 9 which applies water to a rotating foam roller 10. A doctor blade 7 regulates the amount of water applied to the surface of the belt 8. By virtue of the recesses in the surface of the belt, a larger quantity of water is retained on the surface than would be possible if relying solely on surface tension and any dry spots avoided.

In use the sides of the mould and the belt are thoroughly wetted and then molten thermoplastic material is supplied from feed means 1 and the mould 2 is filled with thermoplastic material. The moisture on the sides of the mesh mould 2 and the moisture film on the belt surface 8 prevent the thermoplastic material from sticking to the surfaces. As soon as a sufficiently hard and thick skin is formed on the thermoplastic material the mould 2 is lifted away (and it will be seen that the tapered shape enables the mould to be lifted freely from the solidifying material). As soon as the mould is clear of the top surface of the solidifying material 11, the conveyor 3 is advanced to the extent that the solidifying material takes up the position X. At this point the solidifying material 11 is finely sprayed with cooling water (or air) from the sprays 12 applied to the top surface and the spray 15 applied to the leading end surface. Because a skin of sufficient thickness and hardness has formed on the thermoplastic material at this stage no water is occluded in the thermoplastic material. The next stage is the advancement of the thermoplastic material 11 to the position Y where its top surface is finely sprayed with cooling water or air from spray 14 and its rear surface by water or air from spray 15. The position vacated by the block of material 11 at station X is taken up by a further block of material produced by the mould 2. Blocks of cast material at station Y are transferred from conveyor 3 to a further conveyor 17 via a transfer roller 16, the conveyors 17 has enlarged perforations 18 in its surface. Air blowers 19 and 20 are disposed above and below the conveyor and direct warm or cold air over the solidified blocks of material in order to dry off surface moisture. The bottom run of the conveyor 3 is cooled by water sprays 23 so that by the time the surface reaches the roller 10, the surface of the belt is additionally cool enough to receive a fresh charge of thermoplastic material.

Figure 5:
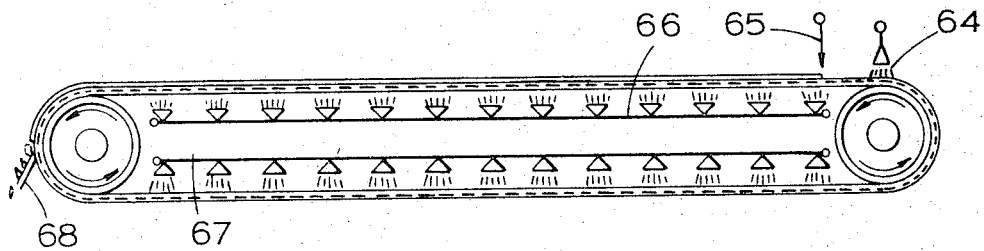
FIG. 5 is an elevation in cross-section of a stainless steel belt of suitable form for carrying out the invention continuously.

FIG. 5 shows a sectional end elevation of a mould having a solid base 29 imprinted with a mesh-like pattern and side walls 30. Superimposed on the side walls 30 are several uninterrupted layers 31 of wire mesh. Controllable moisture feeding means 32 and 33 are provided to maintain a sufficient film of water in and on the wall surfaces 30 and over the base 29. The water level on the surface 29 is controlled by drain pipe 34 and its associated valve. Moisture retaining wells are provided at 35 as integral parts of the mould and serve also for securing the wire mesh layers 31 to the mould walls 30. The upper portions of wire layers 31 are bent around the lip of the mould walls 30 and secured at 36. The mould is also provided with an upper overflow pipe 37. Reinforcing for the eventual casting is shown at 38, and lift hooks at 39. The sequence of operation is as follows; water is supplied from feeding means 32 and 33 with valve 34 open so that a sufficiently thin water layer is maintained over the base 29 and the mesh walls 31 moisture filled. After the wire mesh wall surfaces 31 have been sufficiently moisturised the molten thermoplastic material is poured into the mould, until the desired level is reached when the pour is stopped, i.e. suitably below the overflow level 37. As soon as a skin of sufficient thickness has formed at the casting surface, additional water is added to the mould through feeding means 32 and 33, so as to submerge the casting. Cold water is circulated through the mould until the casting shrinks sufficiently to be completely free from the surface of the mould. The casting is then removed and an absolutely clean mould is ready to take a fresh charge when sufficiently remoisturised as mentioned above. Latent heat generally suffices to dry any remaining surface moisture on the casting itself.

Figure 4:
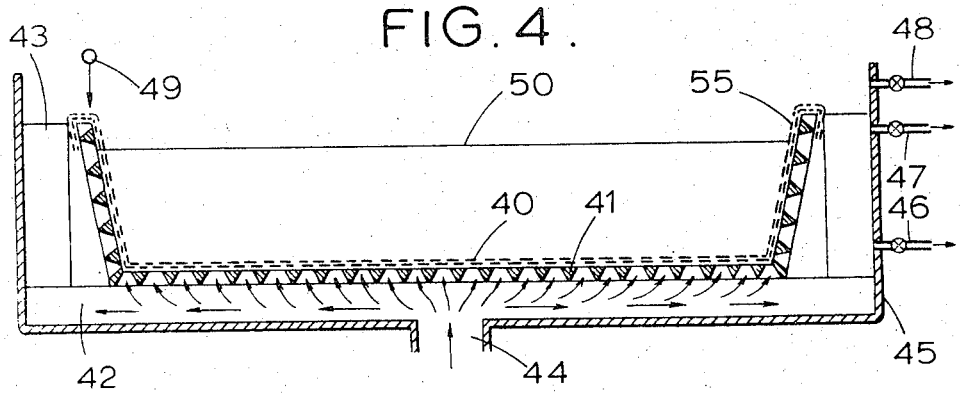
FIG. 4 is a view similar to FIG. 3 of a different type of mould for carrying out the invention.

FIG. 4 shows a similar arrangement to that of FIG. 3, except that in this case there are several layers of wire mesh facing 40 applied to the base and side wall surfaces of a mould, backed with suitable reinforcing means, in this case wedge wire screening 41, supported by a series of flats on edge 42, and held in position by side distance pieces 43. Water is admitted through a valve controlled opening 44, into a tank 45 which contains the mould. Valve-controlled outlets 46, 47 and 48 are provided to maintain the water-level at the various heights required at the different stages in the process. A mist spray (valve controlled) is provided at 49. The finished casting level is shown at 50, and the mesh wire facing is taken over the lip of the mould wall 55, and there suitably secured.

Operation of the process is analogous to that described above in relation to FIG. 3. Thus in this case also, after the moisture holding reinforced layers of wire mesh 40 on the mould walls have been wetted sufficiently, water is admitted at 44, so as to reach the mesh base level at 40 (or slightly above as required), when any excess moisture is drained away at 46. Molten material is then poured into the mesh mould until its desired level is reached, and water is added via 44, so as to rise in height initially just below or at the casting surface level. When a sufficient skin thickness has formed on the surface of the casting, more water is added, so as to submerge the casting. Cold water is passed continuously through the tank and out of overflow pipe 48 so as to cool the casting as quickly as possible. Within a very short time, the casting may be removed quite easily from its mould, leaving it absolutely clean and ready to take a fresh charge after again sufficiently wetting the moisture holding mesh sides of the mould and adjusting the water level.

Figure 6:
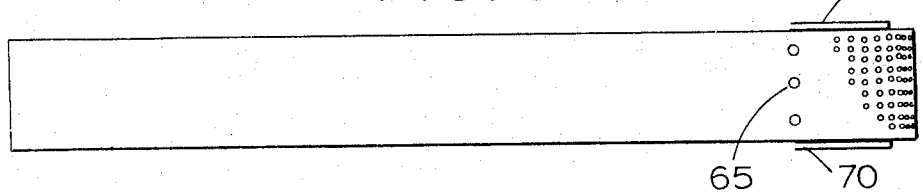
FIG. 6 is a plan view of the belt shown in FIG. 5.

FIGS. 5 and 6 show a sectional elevation and plan view respectively of an endless belt type of conveyor belt which is a strip of stainless steel imprinted with a mesh pattern. Referring to FIG. 5, water is sprayed onto the belt by spraying device 64 upstream of outlets 65 for applying a stream of molten material to the belt. Water cooling sprays are arranged at 66 and 67, and scraper blade at 68, for removal of the solidified cast material. A continuous and sufficiently raised flexible porous faced belt edging 69 and 70 maintained sufficiently moisturised is provided at opposite sides of the belt to contain the molten poured material. Water (or air cooling) sprays may be applied to the surface of the solidifying material on the belting surface if so required.

FIGS. 7 and 8 are respectively sectional and plan views of an endless perforated metal strip conveyor 89 provided with a suitable wire mesh facing 90. The general arrangement is similar to that shown in FIGS. 5 and 6; molten material is applied to the belt through valve-controlled feed means 83 and the belt is wetted prior to deposition of the molten material by sprays 85 and 88. Cooling water sprays 84 are disposed beneath the belt for cooling its under surface and the cast thermoplastic material. Further water sprays 86 are arranged to cool the upper surface of the cast strip downstream of the feed means 83 when a skin of sufficient thickness has formed on its surface. A scraper blade 87 serves to remove the sufficiently solidified product.

The perforated metal strip of the conveyor belt is preferably a stainless steel strip and the wire mesh is preferably a stainless steel wire mesh having a mesh size of +60 mesh USS or less. The wire mesh may be secured to the metal base strip by any desired means, for example by spot-welding, riveting, crimping or bonding with adhesives. Of course more than one layer of wire mesh may be fastened to the base strip. A belt of the form illustrated in FIGS. 7 and 8 is preferred for the purposes of the invention for two main reasons. Firstly the porosity of the belt enabled one to cool the belt more rapidly than with a non-perforated belt and secondly as a result of its construction the belt retains a larger quantity of water.

Referring to FIG. 9 this shows an apparatus in which a pair of moulds 91 and 92 can be swivelled from a filling position to a discharge position. Each mould comprises a base member 93 containing a terra-cotta insert 94 which is supported in a rubber liner 95 and secured by screws 96. Holes 97 are bored through the base members 93 and liners 95 and communicate with the inserts 94 and enable excess water to drain away. A hood 98 is disposed over the mould 91 for spraying its surface with water as a fine mist. Moulds 91 and 92 are mounted on a trunnion 99 by means of which the moulds can be rotated to take up alternate positions.

In use the mould 91 (which has been thoroughly wetted by immersion in the tank 100) is filled with molten thermoplastic material to the level indicated. After an initial skin has formed on the surface of the thermoplastic material, water is applied to the upper surface of the material through hood 98. Rotation of the mould 91 to take up the position of mould 92 results in immersion in the tank 100 and ejection of the casting which may be collected on a conveyor disposed beneath.

FIG. 10 indicates a section through an upright openable mould for casting thermoplastic material. The apparatus comprises a fixed mould half 101 which is hollow and embodies means for circulating a cooling liquid e.g. an antifreeze solution. The working surface 102 of the mould half may be silicone rubber or terra-cotta. A moveable mould half 103 is similarly hollow and contains means for circulating an antifreeze solution and may also be faced on its working surface 104 with silicone rubber or terra-cotta. The moveable mould half is supported for pivotal movement on a pivot 105. At the base of the mould half 103, a protruding lip 106 closes the bottom of the mould.

In use the working faces of the mould are wetted, the halves are closed together and thermoplastic material, e.g. sulphur, poured into the mould cavity. After a short period of time, the mould may be opened and the resultant casting allowed to fall out of the cavity. The cycle may be repeated as often as desired.

Referring to FIGS. 11 and 12 of the drawings the apparatus comprises a conveyor 201 in the form of an endless belt driven in the direction of the arrows P and Q. Two series of applicator devices 202 and 203 are disposed one behind the other in the direction of movement of the belt and are arranged to deposit thermoplastic material such as sulphur in molten condition onto a wetted conveyor belt. The conveyor belt 201 is wetted by means of sprays 204 at a station in advance of the applicators 202 and 203. The construction of the applicators 202 and 203 is shown clearly in FIGS. 11 and 12 from which it will be seen that it comprises a body member 205 having hollow walls for passage of a heating fluid and containing the molten thermoplastic material 206. A plurality of inclined gulleys 207 are received in the body member 205 and are each arranged to dispense molten thermoplastic material onto the conveyor belt passing underneath. Each gulley is formed with a notch 208 through which the molten material flows from the reservoir into the gulley. As will be seen the series of applicators 202 apply an initial layer of thermoplastic material to the belt to which a further coating is applied by applicators 203. The gulley terminates in a discharge head portion located just above the surface of the conveyor 201.

The thermoplastic material deposited on conveyor 201 is then cooled by passage through a cooling chamber 209 in which cold air is blown on the surface of the molten material and the material leaves this chamber with a solidified superficial skin. Water or other liquids sprays 210 are then applied to the material after which the solidified material is stripped from the belt.

Conveyor belt 201 is formed from silicone rubber and its upper surface is divided into a number of shallow recesses by means of a plurality of longitudinal and transverse divisions (the longitudinal divisions 211 are shown in FIG. 12). These divisions have rounded profiles for ease of removal of the solidified material. Preferably means are provided (e.g. at the downstream pulley) for tensioning the belt in a longitudinal or transverse direction for facilitating ejection of solidified material.

The use of gulleys for depositing the thermoplastic material onto the receiving belt has the advantage that a component of motion is imparted to the thermoplastic material in the direction of movement of the receiving surface. The signifance of this is that this movement tends to spread out the impact of the hot material over a larger area of the receiving belt and consequently there is less danger of "hot spots" occurring on the belt as a result of concentration of the hot molten pour. A further sophistication is the provision of the gulleys with laterally widened discharge ends.

It is preferred to contact the molten material with its receiving surface at a temperature relatively close to its melting point. Generally speaking the higher the pour temperature, the thinner is the film of water which can be tolerated on the receiving surface. For example, while it is possible to cast thermoplastic materials at temperatures as high as 250° C. by the method of the invention, the water film should be maintained below about 1/32" in thickness at such temperatures. Reduction of pour temperature to about 180° C. enables an increase in water film thickness of about 1/16", while at a pour temperature of about 160° C., increase of water film thickness to about 1/8" is possible. In the case of sulphur, for example, the normal working temperature is between 120° and 140° C., preferably 120° to 130° C.

As stated above it is preferred to employ an adsorbent receiving surface. A particularly preferred receiving surface is formed from expanded regenerated cellulose. This material readily withstands the normal temperatures at which thermoplastic materials are poured e.g. 120° to 180° C. and has small pores which do not adsorb molten thermoplastic materials. Expanded regenerated cellulose commonly has a density between about 0.05 and about 0.08 ozs. per cubic inch and when saturated with water contain from 0.2 to 0.3 ozs. of water per cubic inch. The method of preparation of expanded regenerated celluloses is well known and is described, for example, in British Pats. 1,174,098; 1,185,488, and 1,197,611. Preferably the regenerated cellulose material is reinforced with an open weave fabric. A very satisfactory conveyor belt is obtained by bonding the regenerated cellulose to a rubber backing. The apparatus in other respects may be as described in connection with FIGS. 5 and 6, FIGS. 7 and 8 or FIGS. 11 and 12. Alternatively the regenerated cellulose may be substituted for the linings of the moulds described in the other figures. In all cases a thickness of about ¼" of regenerated cellulose has been found satisfactory. When the regenerated cellulose is bonded onto a flexible backing strip to form a conveyor, the edges can be turned upwards to form sides to the belt, thereby increasing its capacity. Drain holes are preferably provided in the rubber backing to allow excess moisture to escape. This enables better control of the moisture in the substrate since the drain holes allow the regenerated cellulose to become saturated with water without allowing a film of water to accumulate on the surface. Thus one does not have to ensure that the water film does not exceed the recommended depth.

I claim:

1. A method of continuously casting a thermoplastic material comprising:
    providing an endless belt or drum having an upper sheet portion to receive said thermoplastic material in molten form and a base sheet portion to support said upper sheet portion, said upper sheet portion being formed of a porous permeable material having on its upper surface pores which are small enough to avoid substantial penetration of said molten thermoplastic material, said base sheet portion being apertured to allow free drainage of water therethrough;
    applying a liquid consisting essentially of water to said porous permeable upper portion and allowing any excess of water on said upper sheet portion to drain through said apertured base sheet portion thereby providing a moistened upper surface on said upper sheet portion;
    applying a molten thermoplastic material selected from the group consisting of sulphur, bitumens and thermoplastic resins to said moistened upper surface, whereby the molten material contacting said moistened upper surface forms a solidified skin and instantaneously vaporizes the moisture trapped between said skin and said upper surface thereby prevention adhesion to the upper surface.
    cooling said molten thermoplastic material at least to form a solidified outer large thereon; and
    removing the resulting at least partially solidified thermoplastic material from said moistened upper surface.

2. A method according to claim 1 wherein, subsequent to application of said molten thermoplastic material to said moistened upper surface, said molten thermoplastic material is air cooled to form a solidified outer layer thereon, and after the formation of said solidified outer layer said thermoplastic material is water-cooled.

3. A method according to claim 1 wherein said upper sheet portion comprises one or more layers of wire mesh.

4. A method according to claim 1 wherein said upper sheet portion is a fabric.

5. A method according to claim 1 wherein said upper sheet portion is a permeable expanded plastics material.

6. A method according to claim 1 wherein said endless belt comprises an upper sheet portion of stainless steel wire mesh of 60 mesh USS or finer supported on a base of apertured stainless steel strip.

7. A method according to claim 1 wherein said endless belt comprises an upper sheet portion of expanded regenerated cellulose supported on a base of apertured rubber strip.

8. A method according to claim 1 where said thermoplastic material is sulphur.

References Cited
UNITED STATES PATENTS

| | | | |
|---|---|---|---|
| Re. 19,553 | 4/1935 | Pfohl | 264—337 |
| 2,874,417 | 2/1959 | Ramse | 264—105 |
| 3,265,779 | 8/1966 | Gobla et al. | 264—5 |
| 1,565,798 | 12/1925 | Dillehay et al. | 264—338 |
| 1,312,255 | 8/1919 | King | 264—338 |
| 1,031,227 | 7/1912 | Artmann | 264—338 |
| 2,047,385 | 7/1936 | Sanderes | 264—338 |
| 2,293,249 | 8/1942 | Fischer | 264—338 |
| 3,428,725 | 2/1969 | Delmonte et al. | 264—338 |

ROBERT F. WHITE, Primary Examiner

T. P. PAVELKO, Assistant Examiner

U.S. Cl. X.R.

264—299, 316, 338; 425—71, 91